Aug. 20, 1935.  W. SCHAELCHLIN ET AL  2,011,655

SHIP PROPULSION STABILITY INDICATION AND CONTROL

Filed May 19, 1934  2 Sheets-Sheet 1

WITNESSES:

INVENTORS
Walter Schaelchlin &
Allan D. Forbes.
BY
ATTORNEY

Aug. 20, 1935.  W. SCHAELCHLIN ET AL  2,011,655

SHIP PROPULSION STABILITY INDICATION AND CONTROL

Filed May 19, 1934  2 Sheets-Sheet 2

WITNESSES:
*C. J. Waller*
*Paul E. Friedemann*

INVENTORS
Walter Schaelchlin &
Allan D. Forbes.
BY
*W. R. Coley*
ATTORNEY

Patented Aug. 20, 1935

2,011,655

UNITED STATES PATENT OFFICE 2,011,655

SHIP PROPULSION STABILITY INDICATION AND CONTROL

Walter Schaelchlin and Allan D. Forbes, Wilkinsburg, Pa., assignors to Westinghouse Electric & Manufacturing Company, East Pittsburgh, Pa., a corporation of Pennsylvania Application May 19, 1934, Serial No. 726,546

16 Claims. (Cl. 172—8)

Our invention relates to stability indicating and controlling means, and more particularly to means for indicating and for automatically controlling the stability of a generator and a motor or of one or more generators selectively interconnected with one or more motors.

It is an object of our invention to provide simple and efficient means for controlling the stability of interconnected dynamo-electric machines.

An object of our invention is to maintain substantially constant stability between dynamo-electric machines, i. e., a generator and an interconnected motor, in response to the speed of one of said machines and the excitation of said machines.

Another object of our invention is to maintain substantially constant stability between dynamo-electric machines, i. e., a generator and an interconnected motor, in response to the square of the speed of one of said machines and the voltage of the generator.

A still further object of this invention is to maintain substantially constant stability between a plurality of dynamo-electric machines, i. e., a generator and an interconnected motor, in response to the square of the flux in said machines and the voltage of the generator.

A broad object of this invention is to control the stability of a pair of interconnected dynamo-electric machines in response to selected combinations of speed, flux, excitation, and voltage characteristics of said machines.

Other objects and advantages will become apparent from the following specification and the claims appended thereto, when considered in conjunction with the accompanying drawings, in which:

We have found that when a substantially definite speed load curve is followed in a power system, such as is the case in ship propulsion, the stability of the power system, which includes at least one generator and one motor, may be indicated by a device responsive too the speed of either the generator or the motor and the excitation of the generator and motor, or by a device responsive to the square of the speed of either the generator or the motor and the voltage of the generator, or by a device responsive to the square of the flux in the two machines and the voltage of the generator.

In ship propulsion, the power curve is very nearly a cubic curve and the torque curve is very nearly a parabola or squared curve. It is desirable to maintain the ratio of current to flux constant, and since both increase directly with speed, both current and flux are directly proportional to changes in speed of either the generator or the motor. The torque furnished will then be the desired parabola, and the power curve will be the desired cubic. For proper ship operation, that is, for a proper stable operation of the electric units, namely, the generators and motors, it has been found that the speed, flux, and current should be kept approximately proportional. The relation is, however, such that if speed and flux were held proportional the current must be proportional. An instrument devised to be responsive to the speed of either the motor or the generator and the excitation of the motor and generator will thus give an indication of the stability of operation of the motor and generator. Further, an instrument devised to be responsive to the square of the flux in the machines and the voltage of the generator will thus give an indication of the stability of the operation of motor and generator. Also an instrument devised to be responsive to the square of the speed of either the motor or the generator and the voltage of the generator will give an indication of the stability of operation of the motor and generator.

Furthermore, by a proper interconnection of control circuits and units associated with the instruments mentioned, the excitation of the generator or the motor or both may be automatically regulated to keep a substantially constant stability of operation for the motor. That is, a synchronous motor will operate at a substantially fixed high per cent of its pull-out torque for any frequency of the generator, and similarly, an induction motor will operate at a substantially fixed point, relative to the pull-out torque, on the speed torque curve of the induction motor.

Figure 1:
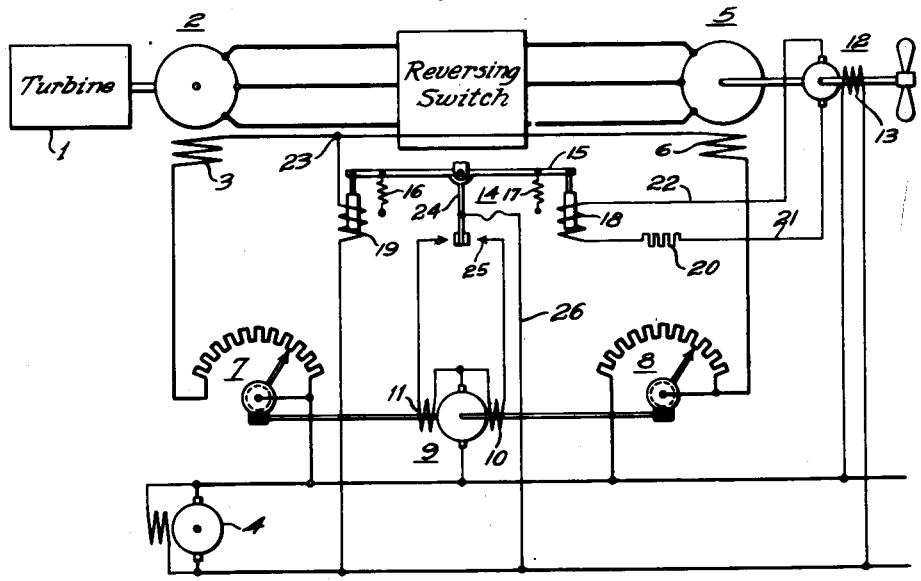
Fig. 1 shows diagrammatically a system for automatically controlling the excitation of both a generator and a synchronous motor connected thereto to maintain substantially constant stability as a function of excitation and speed.

Referring more particularly to Fig. 1 of the drawings, the reference character 1 designates a variable speed prime mover which is schematically shown as a turbine. The speed of the turbine may be changed by varying the admission of steam to the turbine to suit the operating conditions of the system. A synchronous generator or alternator 2 is coupled to the turbine and generates an alternating current having a frequency determined by the speed of the turbine. The generator is provided with a field winding 3 which is interconnected with an exciter 4 in the manner more specifically explained hereinafter.

A propeller driving motor 5 is electrically connected to the generator through the indicated reversing switch, whereby the direction of rotation of the propeller driving motor may be selected at will. The motor is shown as a synchronous motor and is thus provided with a field winding 6.

A pair of rheostats 7 and 8 are motor-operated and in order that the field current in both the motor as well as the generator may be raised or lowered, as desired, the rheostats are mechanically coupled to a motor 9. Motor 9 has a pair of field windings 10 and 11 whereby it may be caused to operate in the one or the other direction by the stability controlling device described hereinafter.

Mechanically coupled to the synchronous motor 5 is a generator 12 which has its field winding 13 separately excited from the exciter 4. Since the field winding 13 is connected to the exciter having a constant voltage, the generator 12 will deliver a voltage directly proportional to the speed of the synchronous motor 5. The generator 12 need not necessarily be of the type disclosed, but may be a small magneto-generator, the field of which is a permanent magnet. Furthermore, the generator 12 need not be coupled to the motor 5 but may just as readily be coupled to the generator 2. It is essential though that the voltage of the generator 12 be primarily directed proportional to the speed of either the propeller driving motor 5 or the generator 2.

To properly control the stability of motor 5, a stability control device 14 is provided which includes a spring balanced lever 15 held in a given balanced position by a pair of springs 16 and 17. The lever is also provided with a pair of armatures which are disposed to be acted upon by solenoids or coils 18 and 19, respectively. Coil 18 is connected directly in circuit relation with the armature of generator 12 through resistor 20 and conductors 21 and 22. It is thus clear that the current in coil 18 will be a direct function of the voltage of the generator 12, namely, a direct function of the speed of the propeller driving motor 5.

Coil 19 is connected in circuit relation with both the field windings 3 and 6 of the generator and motor, respectively, and is thus directly responsive in its action to the excitation of the generator and motor. The circuit for coil 19 may be traced from the lower bus of the exciter 4, through coil 19 to junction 23. Field winding 3 and a portion of the rheostat 7 are connected in parallel circuit relation to field winding 6 and a portion of rheostat 8 to the upper bus of exciter 4. Coils 18 and 19 have the same operating characteristics so that lever 15 will be influenced only by the relative effect of speed and excitation.

As heretofore explained, the effect of coil 18 upon the armature associated therewith is substantially directly proportional to the function of the motor 5. It is therefore obvious that the position of the depending arm 24 will be a function of the excitation and the speed, but as heretofore explained, their ratio has been found to be a very excellent indication of the operation of the propeller driving motor. The stability controlling device 14 is thus responsive to the stability of the system and can be utilized to control the excitation of either the generator or the motor, or both, to maintain a substantially constant stability.

A better understanding of this invention can probably be had by a study of the operation of the system. If it be assumed, for instance, that the speed of the motor 5 increases so that there be a tendency of the motor to operate more nearly at its pull-out torque, the system stability will thus decrease, that is, the effect of coil 19 will have a different effect than coil 18 since the original ratio of voltage to speed no longer obtains. The design of device 14 is such that, for the change of speed assumed, the effect of coil 18 is thus less than the effect of coil 19, and the arm 24 moves in a counter-clockwise direction and makes contact at 25, thereby establishing a circuit from the upper bus or conductor of exciter 4 through the motor 9, field winding 10, contacts 25 and conductor 26 to the lower bus of the exciter 4. The motor 9 will thus rotate in such a direction as to decrease the number of resistor sections of the rheostats 7 and 8, respectively, in circuit with the field windings 3 and 6, respectively. Since the effective resistance in the circuit for the respective field windings is thus decreased the excitation of the two-dynamo-electric machines, the motor and the generator is increased and their tendency to remain in step is much increased. This is readily apparent from the fact that an increased excitation of either one or both machines increases the pull-out torque of the motor 5.

If the operation of motor 5 for any reason is more stable than desired the pull of coil 18 exceeds the pull of coil 19 and an energizing circuit will be established from the exciter through motor 9 and the field winding 11 in such a direction as to rotate the rheostat arms to increase the resistance in circuit relation with the field windings 3 and 6, respectively, and again the stability will be maintained substantially constant.

Figure 2:
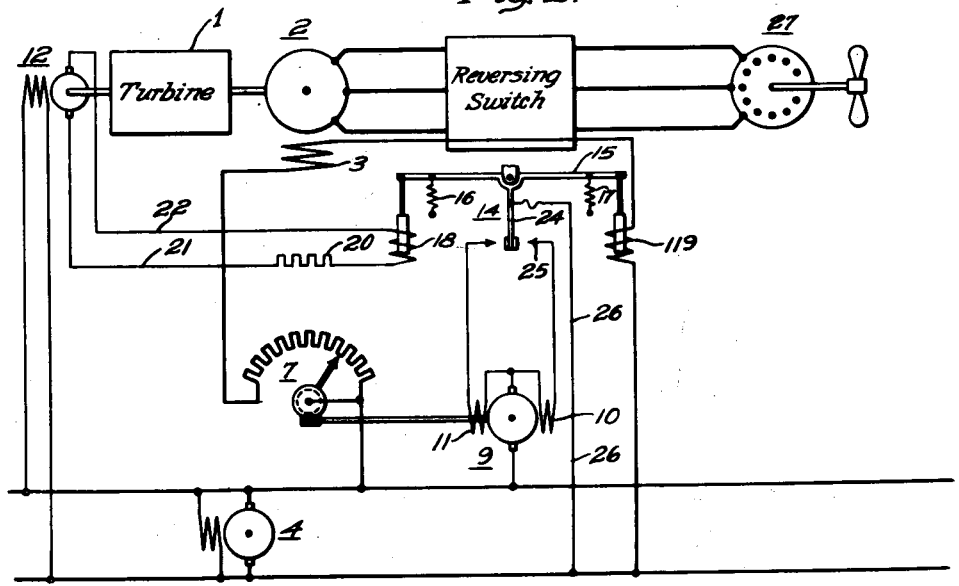
Fig. 2 shows diagrammatically a system for controlling the excitation of a generator as a function of excitation and speed to maintain constant stability of operation for an induction motor and generator.

Fig. 2 shows very much the same subject matter as appears in Fig. 1 except that in this instance an induction motor 27 is used and the stability indicating and controlling device controlling the motor 9 is interconnected with the field winding 3 on the one hand in such a way as to produce an effect on the lever 15 at the right hand side proportional to the excitation of the generator and at the left hand side proportional to the speed of the generator.

In the modification shown in Fig. 2, a decreased speed of the generator 2 decreases the voltage of the generator 2 and thus decreases the effect of coil 19. The motor 9 will thus be operated to increase the field excitation of the generator, and thus the stability will be increased. On the other hand, if the stability be too great, the coil 18 at the left hand end of lever 15 will predominate in the effect, and thus decrease the excitation of the generator.

Figure 3:
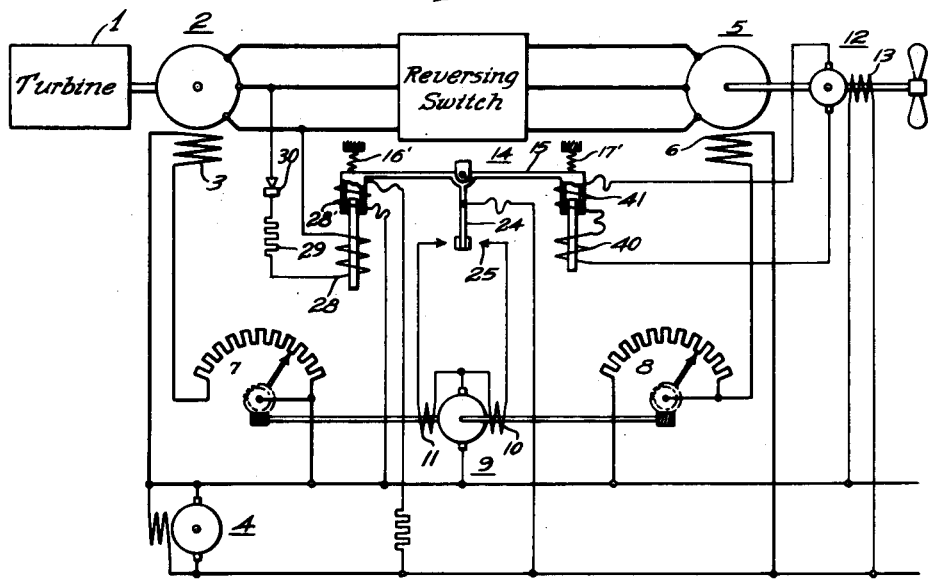
Figs. 3 and 4 are diagrammatic views of modified systems, similar to that shown in Fig. 1, but utilizing respectively, the square of the speed and voltage, and the square of the flux and voltage.

In the modification shown in Fig. 3, the circuit arrangement for most of the system is the same as for the arrangement disclosed in Fig. 1, except that the stability indicating and controlling device 14 has a pair of coils 40 and 41 connected at the right-hand end of the lever 15 to produce an effect proportional to the square of the speed of the propeller driving motor 5. The effect of coil 28, in the circuit of two of the main conductors and the resistor 29 and rectifier 30, on the other hand at the left-hand side of the lever 15 is proportional to the voltage of the generator 2. Any tendency toward either an increase or a decrease of torque demand on the motor 3 will correspondingly increase and decrease, respectively, the field excitation of the generator and motor.

Figure 4:
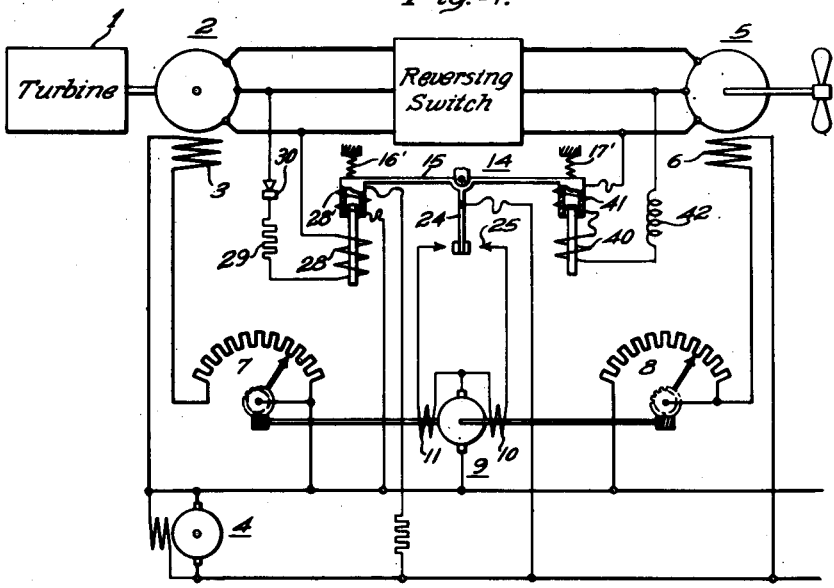

The modification shown in Fig. 4 again resembles the arrangements shown in Figs. 1 and 3 except that in this instance the stability indicating and controlling device is made to respond to the square of the flux and the voltage of the generator. Stationary coil 40 and movable coil 41 are provided with a reactor 42 so that the coil current is proportional to the flux independent of any variation on voltage or frequency, thereby producing a pull proportional to the square of the flux in the machines, whereas coil 28 coacting with uniformly energized movable coil 28' produces an effect proportional to the voltage of the generator. Thus any tendency to pull the generator and motor out of step will be counteracted by the stability controlling devices to increase the excitation of both machines.

It is to be understood that the modifications herein described are merely illustrative of this invention and that other circuit arrangements may be readily devised by those skilled in the art, once they have had the benfit of the teachings of this invention, to accomplish the results heretofore specified, and herein claimed.

We claim as our invention:

1. An electric power system such as is utilized in electric ship propulsion comprising a variable-voltage and variable-frequency dynamo-electric machine and a propeller-driving dynamo-electric machine disposed to be connected to the first-named machine, in combination with stability-responsive means, said means including a pair of magnets arranged to produce opposing effects, one of said magnets being connected to be responsive substantially to the excitation of both of said machines and the other of said magnets being connected to be responsive to the speed of one of said machines.

2. An electric power system including a pair of variable-speed dynamo-electric machines, in combination with stability-responsive means, said means including a pair of magnets arranged to produce opposing effects, one of said magnets being connected to be responsive to the excitation of said machines and the other of said magnets being connected to be responsive to the speed of one of said machines.

3. An electric power system including a pair of dynamo-electric machines, namely, a work motor and a variable-speed alternator arranged to supply alternating current of variable frequency to said work motor, in combination with stability-responsive means including a pair of magnets arranged to produce opposing effects and connected to be responsive to the excitation of the alternator and to the speed of one of said machines, respectively.

4. An electric power system including a pair of dynamo-electric machines, namely, a work motor and a variable-speed alternator arranged to supply alternating current of variable frequency to said work motor, in combination with stability-responsive means including a pair of magnets arranged to produce opposing effects and connected to be responsive to the square of the excitation of said alternator and motor and the speed of one of said machines, respectively.

5. An electric power system including a pair of variable-speed dynamo-electric machines, in combination with stability-responsive means, said means including a pair of magnets arranged to produce opposing effects, one of said magnets being connected to be responsive to the voltage of one of said dynamo-electric machines and the other of said magnets being connected to be responsive to the square of the speed of one of said machines.

6. An electric power system including a pair of dynamo-electric machines, namely, a work motor and a variable speed alternator arranged to supply alternating current of variable frequency to said work motor, in combination with stability-responsive means including a pair of magnets arranged to produce opposing effects and connected to be responsive, respectively, to the voltage of the alternator and the square of the speed of one of said machines.

7. An electric power system including a pair of variable-speed dynamo-electric machines, in combination with stability-responsive means, said means including a pair of magnets arranged to produce opposing effects, one of said magnets being connected to be responsive to the voltage of one of said dynamo-electric machines and the other of said magnets being connected to be responsive to the square of the flux in said dynamo-electric machines.

8. An electric power system including a variable-speed alternator arranged to supply alternating current of variable frequency to a motor, in combination with stability-responsive means including a pair of magnets arranged to produce opposing effects and connected to be responsive to the voltage of the alternator and the square of the flux in the alternator and motor, respectively.

9. An electric power system such as is utilized in electric ship propulsion comprising a variable-voltage and variable-frequency dynamo-electric machine and a propeller-driving dynamo-electric machine adapted to be connected to the first-named machine, in combination with stability-responsive means, said means including a pair of magnets arranged to produce opposing effects, one of said magnets being connected to be responsive to the voltage of one of said dynamo-electric machines and the other of said magnets being connected to be responsive to the square of the flux in said dynamo-electric machines.

10. An electric power system such as is utilized in electric ship propulsion comprising a variable-voltage and variable-frequency dynamo-electric machine and a propeller-driving dynamo-electric machine adapted to be connected to the first-named machine, in combination with stability-responsive means, said means including a pair of magnets arranged to produce opposing effects, one of said magnets being connected to the first-named machine to be responsive to the voltage thereof and the other of said magnets being connected to be responsive to the square of the speed of one of said machines.

11. An electric power system including a pair of dynamo-electric machines, in combination with stability-responsive means including a pair of magnets arranged to produce opposing effects and connected to be responsive to the excitation of said machines and the speed of said machines, respectively.

12. The method of operating an electrically-propelled ship having a variable-speed, variable-voltage alternator connected to operate a propeller-driving motor which includes maintaining a predetermined ratio between the motor speed and the excitation of said machines to thereby maintain the alternator and motor excitation in such conditions as to provide a selected stable operation for the motor and alternator.

13. The method of operating an electrically-propelled ship having a variable-speed, and having a pair of dynamo-electric machines, namely, a propeller-driving motor and a variable-voltage alternator connected to operate the propeller-driving motor which includes maintaining a predetermined ratio between the voltage of the alternator and the square of the speed of one of said machines to thereby maintain the alternator and motor excitation in such conditions as to provide stable operation for the motor and alternator.

14. The method of operating an electrically-propelled ship having a variable-speed, variable-voltage alternator connected to operate a propeller-driving motor which includes maintaining a predetermined ratio between the voltage of the alternator and the square of the flux in the alternator and motor to thereby maintain the alternator and motor excitation in such conditions as to provide stable operation for the motor and alternator.

15. In an electric ship-propulsion system comprising a synchronous generator, a variable-speed prime mover for driving the generator, and a propeller-driving motor connected to the generator, in combination, means responsive directly to the excitation of the generator and motor, balancing means responsive to the speed of the generator for normally balancing the force of said first-named means, and a motor responsive to an unbalance between the forces of said two means for varying the excitation of both the generator and the motor to maintain stable operation of the system.

16. In an electric ship-propulsion system comprising a synchronous generator, a variable-speed prime mover for driving the generator, and a propeller-driving motor connected to the generator, in combination, means responsive directly to the voltage of the generator, balancing means responsive to the square of the flux in the motor and generator, and a motor responsive to an unbalance between the forces of said two means for varying the excitation of both the generator and the motor to maintain stable operation of the system.

WALTER SCHAELCHLIN.
ALLAN D. FORBES.